Sept. 8, 1959 R. P. HEUER 2,902,721
PROCESS OF MOLDING REFRACTORY BRICK
Filed Aug. 8, 1955 2 Sheets-Sheet 1

INVENTOR
Russell P. Heuer
BY
ATTORNEY

Sept. 8, 1959 R. P. HEUER 2,902,721
PROCESS OF MOLDING REFRACTORY BRICK
Filed Aug. 8, 1955 2 Sheets-Sheet 2
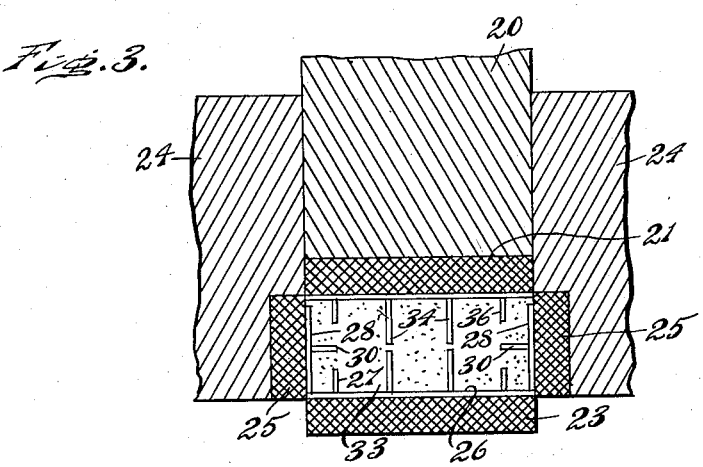
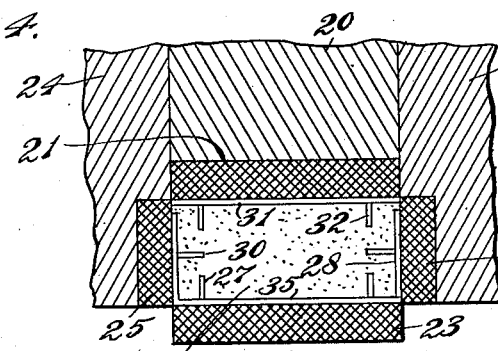
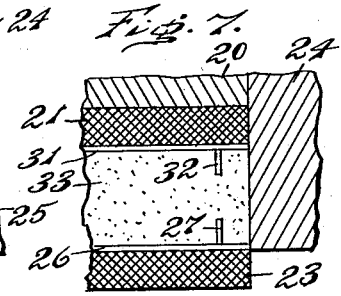
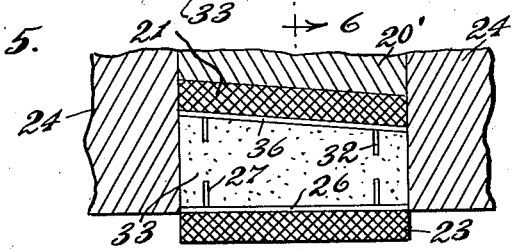
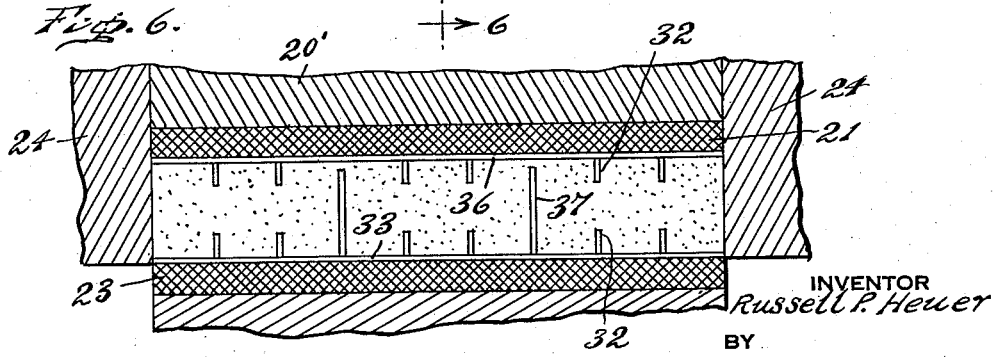
INVENTOR
Russell P. Heuer
BY
ATTORNEYS.

United States Patent Office 2,902,721
Patented Sept. 8, 1959

2,902,721

PROCESS OF MOLDING REFRACTORY BRICK

Russell Pearce Heuer, Bryn Mawr, Pa., assignor to General Refractories Company, a corporation of Pennsylvania Application August 8, 1955, Serial No. 526,845

3 Claims. (Cl. 18—59)

The present invention relates to the molding of nonacid or basic refractory brick having metallic plates on their outer surfaces.

A purpose of the invention is to allow for variations in the relative dimensions of the plates and the mold or variations in the exact dimensions of the mold due to wear or otherwise without producing misshapen or distorted plates on the mold surfaces and without causing irregularities in the plate positioning.

A further purpose is to unite the plates to the refractory by magnetically gripping a lateral plate and top and bottom plates at least certain of which are separate, so as to permit accurate adjustment of the plate position to fit the mold.

A further purpose is to simplify and facilitate the shipment of plates to a point of refractory molding by permitting the use of flat plates.

Further purposes appear in the specification and in the claims.

In the drawings I have chosen to illustrate a few only of the numerous embodiments in which my invention may appear, selecting the forms shown from the standpoints of convenience in illustration, satisfactory operation, and clear demonstration of the principles involved.

Figure 3 is a view similar to Figure 2 showing a variation.

Figure 4 is a view similar to Figure 2 showing a further variation.

Figure 5 is a view simliar to Figure 2 showing the molding of an arch brick.

Figure 6 is a section on the line 6—6 of Figure 5.

Figure 7 is a fragmentary view similar to the right end portion of Figure 2 showing a further variation.

Figure 1:
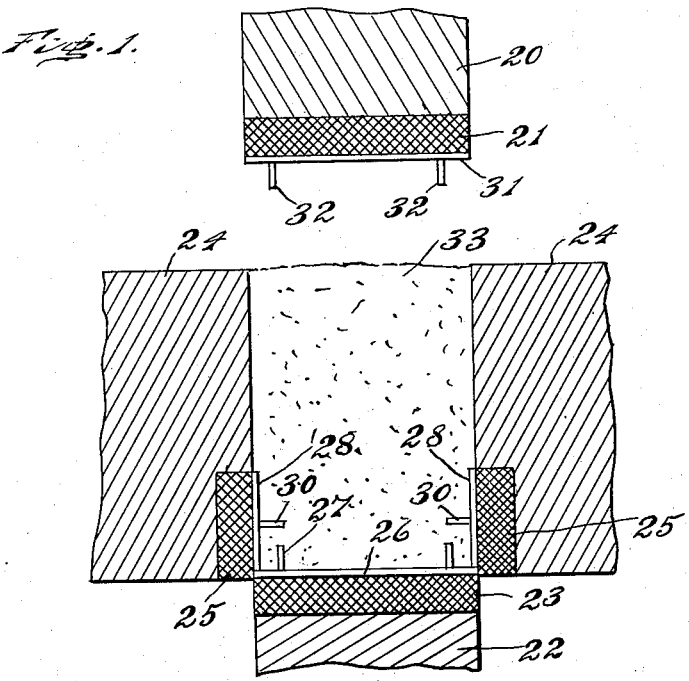
Figure 1 is a diagrammatic vertical section at one end of a mold transverse to the major axis to the brick, showing a mold in open position preparatory to molding according to the invention, with plates in position on the top, bottom and sides of the mold.

Describing in illustration but not in limitation and referring to the drawings:

Extensive use is made in refractory roofs and other structures of basic or nonacid brick consisting of magnesia or mixtures of magnesia and chrome ore in proportions of from 5 to 80 percent chrome ore by weight, with metallic spacer plates usually consisting of steel, iron or alloy steels including stainless steel attached or secured to the outer surface. For the detail of the refractory composition and the plates themselves reference is made to my United States Patents 2,247,376, 2,289,911 and 2,673,373.

The metallic plates are ordinarily of a thickness between $\frac{1}{32}$ inch and $\frac{1}{4}$ inch, extending over a relatively large part of the surface, and suitably omitted at hanger openings or other places where the plates interfere with functioning.

In the prior practice I have used U-shaped spacer plates and also U-shaped spacer plates bent to an angle greater than a right angle, inserted in the bottom of the mold with the arms of the U extending upward. Since the mold dimensions change somewhat with wear and other conditions, these plates must readjust during molding and somewhat modify their side and corner formation to fit the mold.

In accordance with the present invention, I have developed a process in which the plates can adjust to the mold without reshaping the corner of the plates, and without mislocation of the plates no matter how wide the variation in mold dimensions within commercial limits. In accordance with the invention the plate structure is made up largely of flat metallic spacer plates, merely having inwardly projecting tongues, although in some cases angle plates or flat spacer plates with attached internal plates are used. The modified construction of the plates in many cases lends itself to relatively compact shipment. Furthermore, the number of types of plates to be stocked can in some instances be reduced.

I illustrate in the drawings a refractory mold having a top die 20 equipped with a magnetic clutch 21 on its lower end, a lower die 22 equipped with a magnetic clutch 23 on its top surface and mold side walls 24 equipped with magnetic clutches 25 at their lower interior surfaces. It will be understood that the side walls 24 extend around all four sides of the mold.

In molding in accordance with the invention, starting with an empty mold, I place a flat metallic spacer plate 26 on the bottom of the mold against the magnetic clutch 23 and grip it by the magnetic clutch. The use of a magnetic clutch in the bottom of the mold is optional. Prongs or tongues 27 lanced out from the metallic spacer plate 26 extend inwardly (upwardly) in the mold as shown.

The plate 26 preferably extends the full width of the mold as shown and it will ordinarily extend from the hot end of the major part of the distance or suitably all of the distance to the cold end. With the mold still empty lateral metallic spacer plates 28 are placed against the side walls 24 of the mold and projecting tongues 30 lanced out therefrom extend into the interior. The lateral plates are engaged and held by the magnetic clutches 25 at the sides of the mold.

A flat metallic spacer plate 31 is placed on the lower surface of the top die, held by the magnetic clutch 21. Projecting tongues 32 extend down or inwardly and the tongues are lanced out from the spacer plate.

A moist basic refractory composition 33 is placed in the mold inside the spacer plates. The quantity of moisture will be a suitable quantity for molding a magnesia refractory mixture or a refractory mixture of magnesia and chrome ore, suitably of the order of 3 to 5 percent on the weight of the dry refractory.

Figure 2:
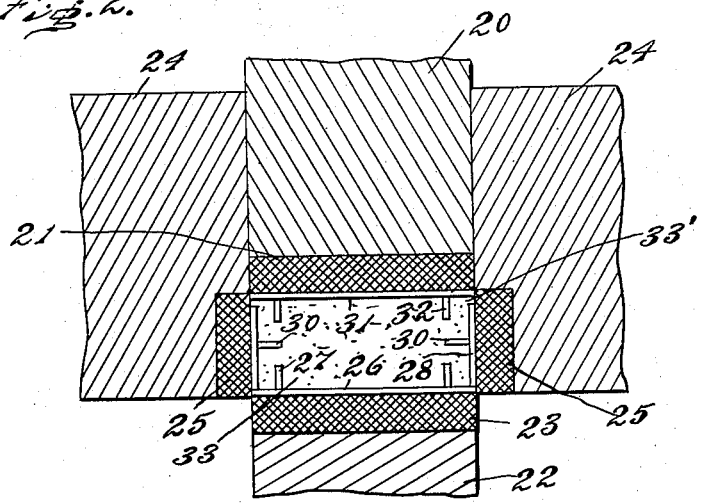
Figure 2 is a view similar to Figure 1 showing the mold closed and the molding completed.

The top and lower dies are moved together, suitably bringing the top die down and applying the mold pressure through the bottom flat plate 26 and the top flat plate 31. The final result is shown in Figure 2, the tongues being embedded in the refractory, the plates having conformed exactly to the outside shape of the mold, and the metallic plates being secured by comolding. There may be refractory at certain corners 33', where the plates do not meet.

The refractory composition is of the character suitable for use without kiln firing as explained in my prior patents, and the brick as illustrated in Figure 1 is in condition for use in a furnace wall or roof after it has merely been dried.

In some cases it is desirable to introduce internal metallic plates 34 which in the form of Figure 3 are attached in spaced relation to both the top and bottom plates and extend longitudinally of the brick, the internal plates being sufficiently short to avoid pressing excessively upon each other when they are placed in line. The procedure is the same as that of Figures 1 and 2 except that when the pressure is applied to move the top die down against the bottom die, the plates 34 are embedded in the refractory brick by comolding.

In some cases it may be desirable to use L-shaped plates, one part of the L forming the top or bottom plate and the other part forming one lateral plate. This is illustrated in Figure 4 where an L-shaped plate 35 has a bottom portion held by the magnetic clutch 23 on the bottom die and a side portion held by the magnetic clutch 25 on one of the side dies. In this instance the top plate and the other side plate are separate as in the previous forms discussed.

In some instances an internal metallic plate or plates may be located transversely instead of longitudinally. This is shown in Figures 5 and 6 which show the molding of an arch brick using a tapered top die 20' provided with a magnetic clutch 21 set on a taper. The plate 36 is in tapered position and not parallel to the bottom plate 26. Both dies may be in tapered position if desired. Internal metallic plates extend transversely and are shown at 37 in spaced relation secured to the bottom plate 36. In this instance the internal plates extend entirely from one of the flat plates instead of from both the top and bottom as in Figure 3.

It is sometimes desirable to utilize only a single lateral plate and Figure 7 illustrates a fragment corresponding to Figure 2 in which the lateral plate 28 at the right hand side has been omitted, it being understood that such a plate is present on the left hand side (not shown).

Thus it will be evident that by the principles of the invention it is possible to mold a basic refractory brick with external plates and also if desired with internal plates, applying the plates by comolding, but without the necessity of preforming the plates into a closed contour.

In all cases the extent of the lateral plates, the top plate, and the internal plates in the direction transverse to the paper will suitably be the same as that of the bottom plate.

While I have shown magnetic chucks for gripping the plates, I can use any other gripping means such as suction chucks or adhesive.

In view of my invention and disclosure variations and modifications to meet individual whim or particular need will doubtless become evident to others skilled in the art, to obtain all or part of the benefits of my invention without copying the process shown, and I, therefore, claim all such insofar as they fall within the reasonable spirit and scope of my claims.

Having thus described my invention what I claim as new and desire to secure by Letters Patent is:

1. In a method of producing a nonacid refractory brick with comolded metallic plates in the cavity of a mold having side walls between relatively movable top and bottom dies, which comprises introducing flat metallic plates into the mold cavity, one of said plates being a bottom plate corresponding to the bottom die of the mold and two of said plates being side wall plates corresponding to opposite side walls of the mold, at least one of the side wall plates being separate from the other said plates, disposing said bottom plate on the inside surface of the bottom die of the mold and fitting said side wall plates to the inside surface of the mold by moving the side wall plates relative to each other to the inside surfaces of the corresponding side walls, retaining said side wall plates in fitted position against the corresponding side walls of the mold, placing within the mold a moist refractory composition suitable for use without kiln firing and composed of refractory of the class consisting of magnesia and mixtures of magnesia and chrome ore against said plates, and pressing to form a brick by relatively moving the top and bottom dies of the mold toward each other thus applying pressure to the refractory composition and plates and uniting all of the plates to the refractory by comolding.

2. In a method of producing a nonacid refractory brick with comolded metallic plates in the cavity of a mold having side walls between relatively movable top and bottom dies, which comprises introducing flat metallic plates into the mold cavity, one of said plates being a bottom plate corresponding to the bottom die of the mold and two of said plates being side wall plates corresponding to opposite side walls of the mold, both of said side wall plates being separate from the bottom plate and from each other, disposing said bottom plate on the inside surface of the bottom die of the mold and fitting said side wall plates to the inside surface of the mold by moving the side wall plates relative to each other to the inside surfaces of the corresponding side walls, retaining said side wall plates in fitted position against the corresponding side walls of the mold, placing within the mold a moist refractory composition suitable for use without kiln firing and composed of refractory of the class consisting of magnesia and mixtures of magnesia and chrome ore against said plates, and pressing to form a brick by relatively moving the top and bottom dies of the mold toward each other thus applying pressure to the refractory composition and plates and uniting all of the plates to the refractory by comolding.

3. In a method of producing a nonacid refractory brick with comolded metallic plates in the cavity of a mold having side walls between relatively movable top and bottom dies, which comprises introducing flat metallic plates into the mold cavity, one of said plates being a bottom plate corresponding to the bottom die of the mold and two of said plates being side wall plates corresponding to opposite side walls of the mold, one of said side wall plates being integral with the bottom plate, and the other of said side wall plates being separate from the other said plates, disposing said bottom plate on the inside surface of the bottom die of the mold and fitting said side wall plates to the inside surface of the mold by moving the side wall plates relative to each other to the inside surfaces of the corresponding side walls, retaining said side wall plates in fitted position against the corresponding side walls of the mold, placing within the mold a moist refractory composition suitable for use without kiln firing and composed of refractory of the class consisting of magnesia and mixtures of magnesia and chrome ore against said plates, and pressing to form a brick by relatively moving the top and bottom dies of the mold toward each other thus applying pressure to the refractory composition and plates and uniting all of the plates to the refractory by comolding.

References Cited in the file of this patent

UNITED STATES PATENTS

| 2,247,376 | Heuer | July 1, 1941 |
| 2,673,373 | Heuer | Mar. 30, 1954 |
| 2,781,006 | Heuer | Feb. 12, 1957 |